(12) United States Patent
Cho et al.

(10) Patent No.: US 7,480,383 B2
(45) Date of Patent: Jan. 20, 2009

(54) APPARATUS AND METHOD FOR SCRAMBLING HIGH-RATE DATA

(75) Inventors: Yong-Seong Cho, Daejon (KR);
Joon-Young Jung, Daejon (KR);
O-Hyung Kwon, Daejon (KR); Soo-In Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 640 days.

(21) Appl. No.: 10/950,328

(22) Filed: Sep. 23, 2004

(65) Prior Publication Data
US 2005/0135617 A1 Jun. 23, 2005

(30) Foreign Application Priority Data
Dec. 23, 2003 (KR) .................. 10-2003-0095645

(51) Int. Cl.
*H04L 9/00* (2006.01)
(52) U.S. Cl. .................. 380/262; 380/259; 380/260
(58) Field of Classification Search .................. None
See application file for complete search history.

(56) References Cited

U.S. PATENT DOCUMENTS 6,408,076 B1 * 6/2002 Bewick .................. 380/206

7,239,702 B1 * 7/2007 Asano et al. .................. 380/201
7,296,159 B2 * 11/2007 Zhang et al. .................. 713/171

FOREIGN PATENT DOCUMENTS

JP 04-296184 10/1992
KR 00216538 B1 5/1999

* cited by examiner

*Primary Examiner*—Pramila Parthasarathy
(74) *Attorney, Agent, or Firm*—Blakely, Sokoloff, Taylor & Zafman (57) ABSTRACT

The apparatus and method for scrambling high-rate data is disclosed. The apparatus includes a first storing unit for storing a transport stream (TS) inputted from an external device; a common key (CK) generating unit for generating a CK by receiving a control word (CW) from an external conditional access system (CAS); a key scheduling unit for generating predetermined number of keys (KK)s by receiving the CK from the CK generating unit; a plurality of enciphering units for enciphering the TS transmitted from the first storing unit based on the predetermined number of KKs and the CK; a second storing unit for storing the TS enciphered by the enciphering units and outputting the enciphered TS; and a controlling unit for controlling the multiple enciphering units.

8 Claims, 6 Drawing Sheets

APPARATUS AND METHOD FOR SCRAMBLING HIGH-RATE DATA

FIELD OF THE INVENTION

The present invention relates to an apparatus and a method for scrambling high-rate data; and, more particularly, to an apparatus and a method for scrambling high-rate data, which is required for providing a service such as digital cable TV service.

DESCRIPTION OF RELATED ART

Generally, cable television (TV) service provides only a basic audio/video service in a conventional analog broadcasting service. However, as a broadcasting service is digitalized, the cable TV service starts to provide not only a multimedia service but also an interactive TV service. In particular, an international standard OpenCable™ is adopted as a standard of Korean digital cable TV service. The digital cable TV service will be lunched soon in Korea.

The digital broadcasting service provides multi channels and high quality as the media industry develops. In particular, since transmission errors rarely occurr in a digital cable TV service system contrary to a digital terrestrial and satellite TV service, the digital cable TV service system is most advantageous to the transmission of high-rate broadcasting data. That is, in the digital terrestrial and satellite TV service, additional data have to be transmitted in order to compensate for the transmission errors. However, the additional data to compensate the transmission errors are not necessary in the digital cable TV system, more amount of broadcasting data can be transmitted in the digital cable TV system.

A broadcasting transmission rate presented by the OpenCable™, which is a standard of the Korean digital cable TV service, is varied according to a modulation system. For 64 Quadrature Amplitude Modulation (QAM), the broadcasting transmission rate is about 27 mega bits per second (Mbps) and for 256 QAM, the broadcasting transmission rate is about 36 Mbps. As above-mentioned, the broadcasting transmission rate is relatively high. Furthermore, the digital broadcasting industry will require higher-speed data transmission rates in the future.

Meanwhile, in a pay-TV service, the most important matter is to provide the pay-TV service only to service subscribers. This requires an apparatus for providing a digital pay-TV service only to the service subscribers by scrambling just as a conventional analog pay-TV service, the apparatus is needed. Also, required is a scrambling system for scrambling high-rate data in real time in the broadcasting system, which requires higher-speed data transmission rate.

The scrambling system will be described in detail with reference to FIGS. 1 to 3.

Figure 1:
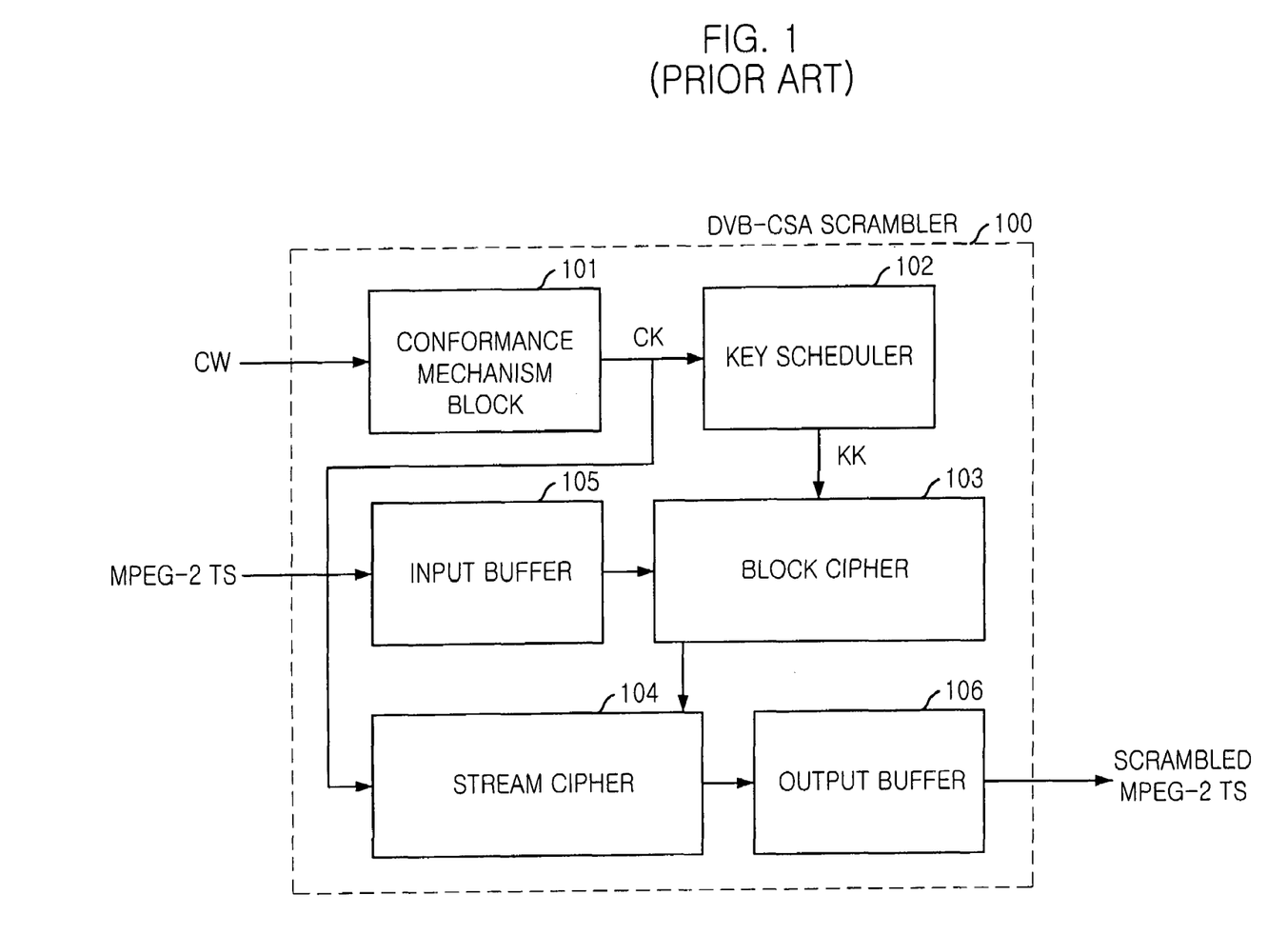
FIG. 1 is a block diagram showing a conventional digital video broadcasting-common scrambling association (DVB-CSA) scrambler.

FIG. 1 is a block diagram showing a conventional digital video broadcasting-common scrambling algorithm (DVB-CSA) scrambler.

First of all, the digital cable TV broadcasting environment is described as follows.

The digital cable TV system is appropriate for the transmission of high-rate broadcasting data. And, it is expected to require higher data transmission rate in the future. In the pay-TV service such as the cable TV service, subscriber management and a conditional access system (CAS) are indispensable conditions. That is, the pay-TV service system manages subscriber information, e.g., personal information, service subscription information, charging information, etc. and provides a subscribed pay-TV service to each subscriber.

A scrambling system provides a TV service only to the service subscribers, and it is an essential subsystem of the CAS. In the broadcasting system, because scrambling has to be performed in real time, a high-speed scrambler is required in order to scramble the high-rate broadcasting data.

The DVB-CSA scrambler 100 includes a conformance mechanism block 101, a key scheduler 102, a block cipher 103, a stream cipher 104, an input buffer 105 and an output buffer 106.

The conformance mechanism block 101 receives a control word (CW) from the CAS and generates a common key (CK). The key scheduler 102 receives the CK from the conformance mechanism block 101 and generates 56 keys (KK)s, which will be used in the block cipher 103. The block cipher 103 enciphers Moving Picture Experts Group-2 (MPEG-2) transport stream (TS) based on the KKs received from the key scheduler 102. The stream cipher 104 enciphers the enciphered MPEG-2 TS based on the CK received from the conformance mechanism block 101 and outputs scrambled MPEG-2 TS through the output buffer 106. The input buffer 105 and the output buffer 106 store the input TS and the output TS respectively.

The basic unit for scrambling is the MPEG-2 TS packet, which is 184 bytes obtained by removing 4-byte header information from a 188-byte MPEG-2 TS packet. If a TS packet includes an adaptation field or is smaller than 184 bytes, the basic unit for scrambling can be changed. However, scrambling is performed every 184 bytes generally. In other words, one MPEG-2 TS packet is scrambled, and then the next MPEG-2 TS packet is scrambled in the same process, repeatedly.

It is needed to figure out how many operations are performed from the mount one TS packet is inputted till the scrambled TS packet is outputted. The number of operations is very important to implement a real time scrambler.

Figure 2:
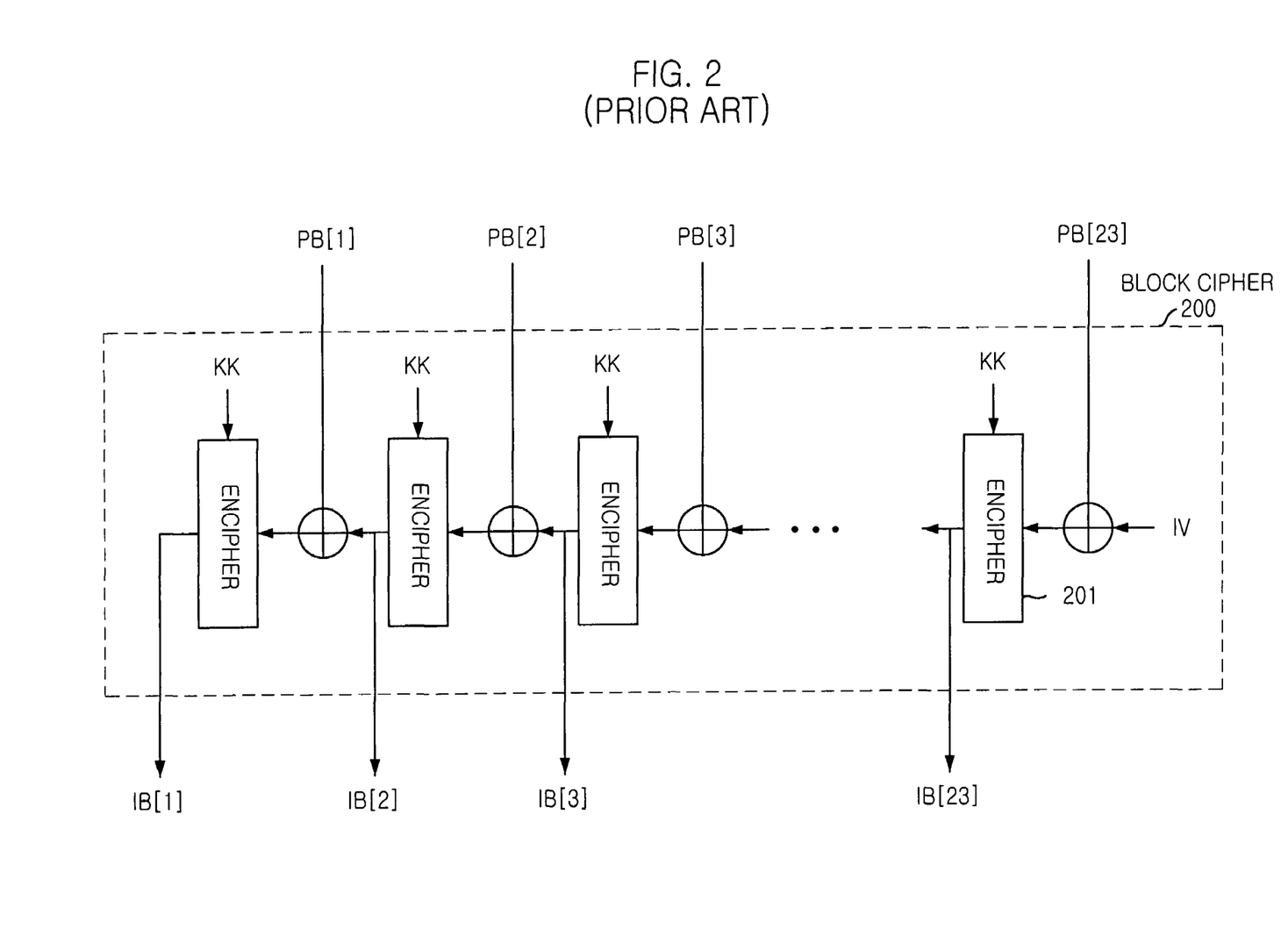
FIG. 2 is a block diagram illustrating a block cipher in accordance with a preferred embodiment of the conventional DVB-CSA scrambler in FIG. 1.

FIG. 2 is a block diagram illustrating a block cipher in accordance with a preferred embodiment of the conventional DVB-CSA scrambler in FIG. 1.

As shown, the block cipher 200 includes 23 enciphers 201. PB[n], (n=1, 2, . . . , 23) inputted to the block cipher 200 means a payroad of the TS. PB[n] means 23 8-byte data blocks obtained by dividing the remaining data, which is obtained by subtracting the 4-byte header information from the TS packet, i.e., 184 bytes, by 8 bytes.

Operation of the block cipher 200 is as follows. At first, the block cipher 200 receives the PB[23] and the encipher 201 receiving the PB[23] receives the KK and outputs IB[23]. Then, the IB[23] and the PB[22] are operated based on exclusive OR (XOR) and are inputted to the next encipher 201, repeatedly. The operation of the block cipher 200 is continued until the encipher 201 receiving the PB[1] outputs the IB[1].

Each encipher 201 includes 8 8-bit shift registers. Input PB[n] is stored initially at each encipher 201. Each encipher 201 changes register values using the 56 KKs sequentially during 56 steps and at last outputs the IB[n]. Therefore, the total operation amount that one TS packet passes through the block cipher 200 is 1,288 steps, i.e., 56 steps×23 enciphers.

Figure 3:
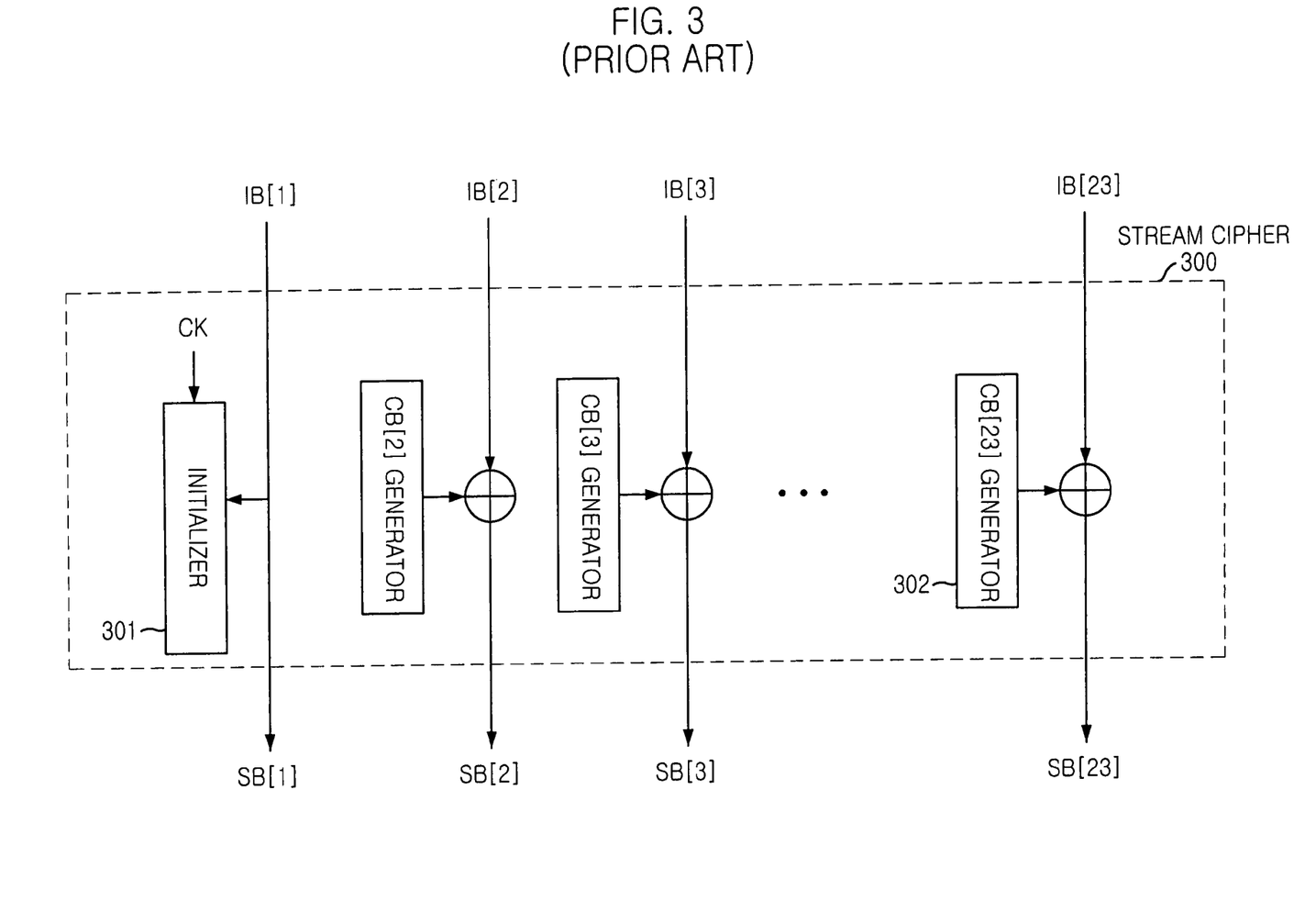
FIG. 3 is a block diagram illustrating a stream cipher in accordance with a preferred embodiment of the conventional DVB-CSA scrambler in FIG. 1.

FIG. 3 is a block diagram illustrating a stream cipher 104 in detail in accordance with a preferred embodiment of the conventional DVB-CSA scrambler of FIG. 1 in order to calculate the operation amount of the stream cipher 104.

As shown in FIG. 2, 23 8-byte data blocks IB[n] transmitted from the block cipher 200 are inputted to the stream cipher 300 from the IB[1] to the IB[23] sequentially.

The stream cipher 300 includes an initializer 301 in a functional point of view and 22 CB [n] generators 302.

From a viewpoint of hardware, the stream cipher 300 is a finite state machine including 107 state bits.

First of all, the initial block 301 initializes 107 state bits based on the IB[1] inputted from the block cipher 200 and the CK generated by the conformance mechanism block 101.

The initialization needs 32 steps and, values of the state bits are changed at every step. The IB[1] is used for initialization only and outputted as SB[1]. Then, the CB[n] generator 302 needs 32 steps and generates 2 bits at every step. After 32 steps, the CB[n] generator 302 generates 2×32=64 bits, i.e., 8-byte CB[n] (n=2, 3, . . . , 23). The 8-byte CB[n] and the IB[n] are operated based on the XOR and are outputted as SB[n]. Therefore, the total operation amount for scrambling the 23 8-byte data blocks IB[n] by passing through the stream cipher 300 and outputting scrambled 23 8-byte data blocks IB[n] is 736 steps (32+704=736 steps): 32 steps for the initialization and 22×32=704 steps for generating the CB[n].

As above-mentioned, the total operation amount from the input of the MPEG-2 TS to the output of the scrambled MPEG-2 TS is examined simply. According to the above calculation, the operation amount for scrambling one TS packet needs 1,288 steps in the block cipher 200 and 736 steps in the stream cipher, i.e., totally 2,024 steps. In consideration of input/output TS packet buffing, interfacing among the blocks and so on, about 2,300 steps are required to scramble one TS packet.

For the operation amount unit, a step can be expressed as a clock when the above scrambling algorithm is implemented with field programmable gate array (FPGA) operated by clock synchronization. Thus, during one clock period, a process of one step is operated. In order to raise the operation rate, a short clock period can be used. However, the clock period cannot be shortened unconditionally because a time for processing each step, i.e., propagation delay time, should be considered. Also, because the propagation delay time is varied according to the characteristics of each FPGA, an accurate delay time can be calculated by directly porting to FPGA or using a simulation program.

Hereinafter, the present invention considers the propagation delay time according to the FPGA as above-mentioned but the present invention puts more focus on a method for speeding up a scrambling rate. The clock period used in the present invention is 20 nano-seconds (ns), which is time for performing operation most stably in consideration of the propagation delay time taken for processing one step.

Under the condition as above, the total time for processing operations required for scrambling a 188-byte TS packet based on a 20 ns clock period is 2,300×20 ns=46,000=46 μs(micro-sec). According to the above-calculation, if the clock period is 20 ns, the amount of data processed per second, i.e., bits per second, is (188×8 bit)/(46×10$^{-6}$ sec)=32.7× 10$^6$ bps=32.7 Mbps. However, the 32.7 Mbps processing rate cannot support the 39 Mbps data processing rate of the 256 QAM modulation scheme required by the OpenCable™ standard.

Therefore, a more high-speed scrambling system with a higher operation rate is required. Also, the method for implementing the scrambling system which can cope with a broadcasting environment having higher data transmission rate is required.

SUMMARY OF THE INVENTION

It is, therefore, an object of the present invention to provide an apparatus for scrambling high-rate data, wherein the apparatus can support a standard and a data transmission rate in order to provide a digital pay-TV service and can implement high-speed scrambling in a high-speed data transmission rate broadcasting system and a method thereof.

In accordance with an aspect of the present invention, there is provided an apparatus for scrambling high-rate data, the apparatus including: a first storing unit for storing a transport stream (TS) inputted from an external device; a common key (CK) generating unit for generating a CK by receiving a control word (CW) from an external conditional access system (CAS); a key scheduling unit for generating predetermined number of keys (KK)s by receiving the CK from the CK generating unit; a plurality of enciphering units for enciphering the TS transmitted from the first storing unit based on the predetermined number of KKs and the CK; a second storing unit for storing the TS enciphered by the enciphering units and outputting the enciphered TS; and a controlling unit for controlling the multiple enciphering units.

In accordance with another aspect of the present invention, there is provided a method for scrambling high-speed data, the method including the steps of: storing an inputted transport stream (TS); determining whether to perform scrambling or not by extracting a packet identifier (PID) information from the TS data and determining a control word (CW) to be used; selecting an idle-state enciphering means among a plurality of enciphering means; generating a common key (CK) and predetermined number of keys (KK)s which are required for enciphering based on the CW and storing the CK and the KKs; enciphering the TS based on the CK and the KKs; and storing and outputting the scrambled TS.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Hereinafter, an apparatus and a method for scrambling high-rate data will be described in detail with reference to the accompanying drawings.

Figure 4:
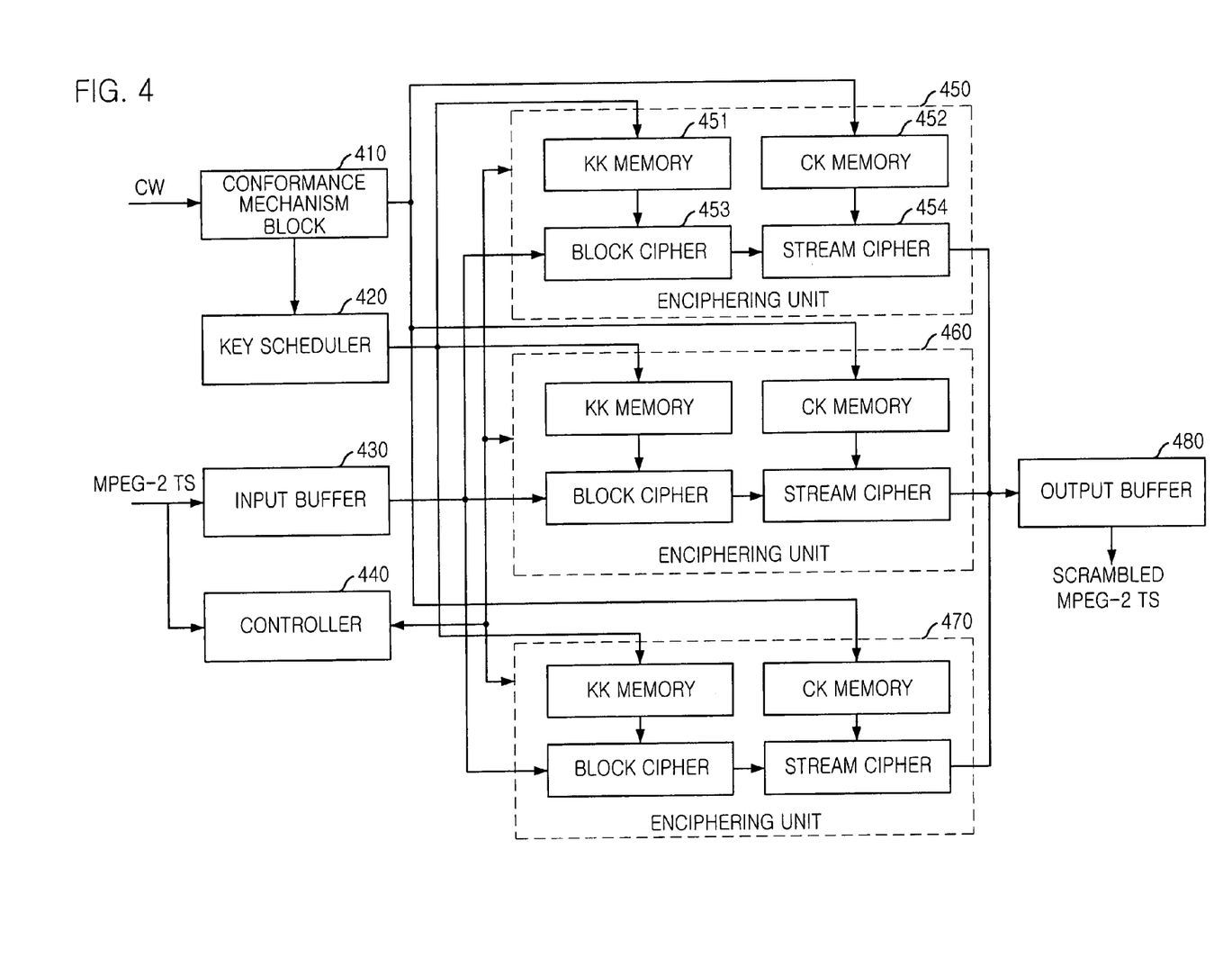
FIG. 4 is a block diagram describing an apparatus for scrambling high-rate data in accordance with a preferred embodiment of the present invention.

FIG. 4 is a block diagram describing an apparatus for scrambling high-rate data in accordance with a preferred embodiment of the present invention.

The apparatus for scrambling high-rate data, which will be hereinafter, referred to as a high-rate scrambler includes a conformance mechanism block 410, a key scheduler 420, an input buffer 430, a controller 440, a plurality of enciphering units 450, 460 and 470 and an output buffer 480.

The conformance mechanism block 410 receives the control word (CW) from the conditional access system (CAS) and generates a common key (CK). The key scheduler 420 receives the CK from the conformance mechanism block 410 and generates 56 keys (KK)s which will be used in the enciphering units 450, 460 and 470. The enciphering units 450, 460 and 470 receive MPEG-2 TS through the input buffer 430, encipher the MPEG-2 TS based on the CK received from the conformance mechanism block 410 and the 56 KKs received from the key scheduler 420 and outputs scrambled MPEG-2 TS through the output buffer 480. The input buffer stores the inputted MPEG-2 TS data and transmits them to the enciphering units 450, 460 and 470. The output buffer 480 stores the enciphered MPEG-2 TS. The controller 440 controls the enciphering units 450, 460 and 470.

Each of the enciphering units 450, 460 and 470 includes a KK memory 451, a CK memory 452, a block cipher 453 and a stream cipher 454.

The KK memory stores the 56 KKS generated by the key scheduler 420. The CK memory 452 stores the CK generated by the conformance mechanism block 410. The block cipher 453 enciphers the MPEG-2 TS received from the input buffer 430 based on the 56 KKs. The stream cipher 454 enciphers the enciphered MPEG-2 TS based on the CK stored in the CK memory 452 and outputs the scrambled MPEG-2 TS through the output buffer 480.

As shown, the present invention includes a plurality of the enciphering units 450, 460 and 470 in order to process inputted TS continuously when one TS is processed. The number of the enciphering unit can be determined according to the system.

The conformance mechanism block 410, the key scheduler 420, the block cipher 453, the stream cipher 454, the input buffer 430 and the output buffer 480 operate the same processes of FIG. 1.

The controller 440 controls the enciphering units 450, 460 and 470 by providing enable signals. Thus, the enciphering units 450, 460 and 470 receive the enable signals, and then they can receive inputted MPEG-2 TS, the CK and the KKs from the input buffer 430, the conformance mechanism block 410 and the key scheduler 420 respectively.

In case that the data transmission rate is faster than a processing speed of one or more enciphering units, the controller 440 provides the enable signal to the idle enciphering unit so that the TS packet is processed without time delay when another TS packet is inputted.

The KK memory 451 and the CK memory 452 store the KKS to be used at the block cipher 453 and the CK to be used in the stream cipher 454 respectively.

As mentioned above, the basic unit of the scrambling is the MPEG-2 TS packet. Therefore, the CW to be used for scrambling is varied with the packet identifier (PID) of each TS packet, and also is changed according to time in order to increase frequency. Thus, for scrambling current TS packet, the CW corresponding to the PID of the current TS packet has to be used. If a TS packet is not be scrambled, the TS packet passes through the enciphering units 450, 460 and 470 without data change but the transit time is synchronized with other TS packets to be scrambled.

The conformance mechanism block 410 and the key scheduler 420 will change the CK and the KKs if the next TS packet is inputted even though the current TS packet is not processed completely. Therefore, the KK memory 451 and the CK memory 452 are needed in order to maintain the KKs and the CK for the current TS packet.

Figure 5:
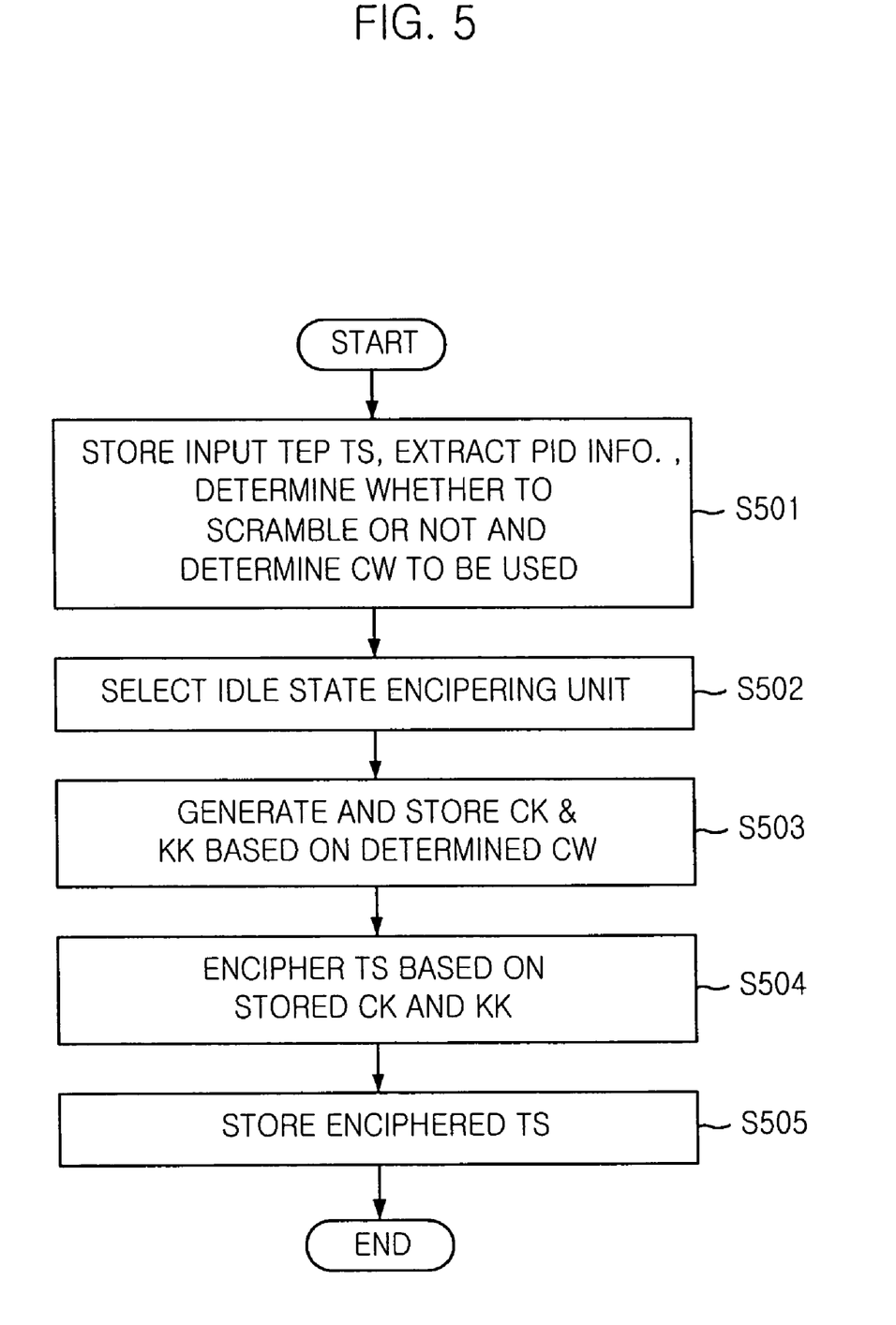
FIG. 5 is a flowchart diagram describing a method for scrambling high-rate data in accordance with a preferred embodiment of the present invention.

FIG. 5 is a flowchart diagram describing a method for scrambling high-rate data in accordance with a preferred embodiment of the present invention.

The inputted TS is stored, and it is determined whether to perform scrambling or not and which CW will be used by extracting the PID information at step S501.

An idle-state enciphering unit is selected at step S502.

The CK and the KKs are generated based on the CW and stored at step S503.

The TS is enciphered based on the CK and the KKs at steps S504 and the enciphered TS is stored at step S505.

Hereinafter, the present invention will be described with an example of a scrambling system using two enciphering units, i.e., a first enciphering unit 450 and a second enciphering unit 460.

At first, if TS is inputted, the input buffer 430 stores the TS. The controller 440 extracts PID information from the TS packet and determines whether to perform scrambling or not and which CW will be used for the TS. That is, it is determined by checking whether a "PID-CW" pair, which is matched with the current PID, exists or not in the CW memory (not shown).

The controller 440 provides the enable signal to the idle enciphering unit and, wherein the enable signal can be one bit because it is assumed that there are two enciphering units. It is assumed that if the enable signal is '1', the first enciphering unit 450 operates and if the enable signal is '0', the second enciphering unit 460 operates.

If the first enciphering unit 450 is selected, the CW generates the CK and the KKs by passing through the conformance mechanism block 410 and the key scheduler 420. The CK and the KKs are stored in the CK memory and the KK memory of the first enciphering unit 450, wherein the enable signal of the controller 440 maintains '1'.

Then, the first enciphering unit 450 operates after the CK and the KKs are stored, wherein the first enciphering unit 450 transmits an enable completion signal to the controller 440.

Subsequently, if the next TS packet is inputted, the above processes are operated. The controller 440 outputs the enable signal as '0' because the first enciphering unit 450 is operating.

In this case, the enable signal of the controller 440 maintains '0'.

According to the enable signal, the second enciphering unit 460 operates as above. The second enciphering unit 460 operates after the CK and the KKs are stored, wherein the second enciphering unit 460 transmits the enable completion signal to the controller 440.

Meanwhile, if the block cipher 453 and the stream cipher 454 of the first enciphering unit 450 complete the process, the first enciphering unit 450 outputs the scrambled MPEG-2 TS through the output buffer 480. Then, the first enciphering unit 450 transmits an enciphering completion signal to the controller 440 and changes the state into an idle state.

After receiving the enciphering completion signal from the first enciphering unit 450, the controller 440 operates the above-process and transmits the enable signal to the first enciphering unit 450.

In the same manner, if the second enciphering unit 460 completes all process, the second enciphering unit 460 operates the above-process.

The first and second enciphering units operate repeatedly as long as TS is inputted.

Figure 6:
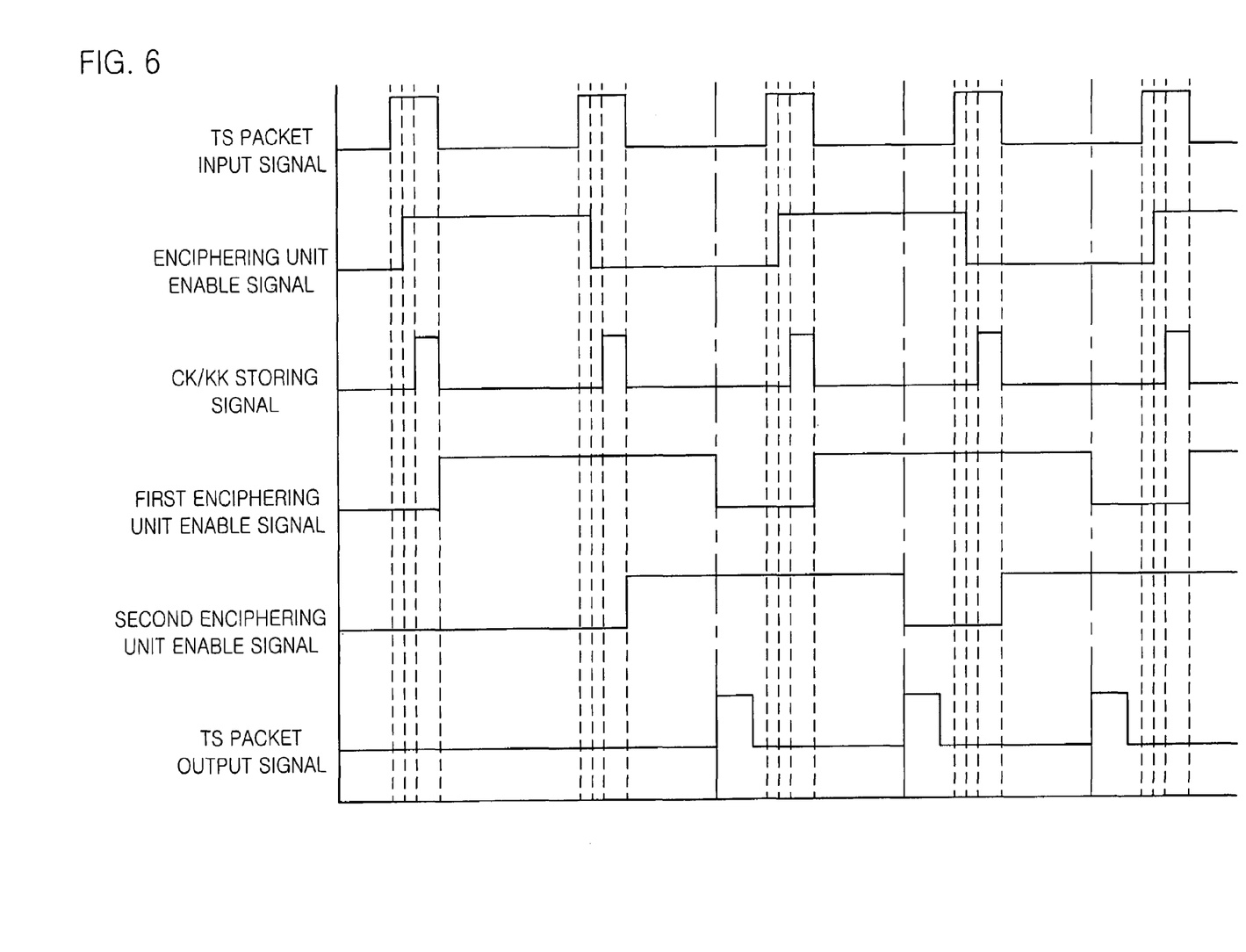
FIG. 6 is a timing diagram describing an apparatus for scrambling high-rate data in accordance with a preferred embodiment of the present invention.

FIG. 6 is a timing diagram describing an apparatus for scrambling high-rate data in accordance with a preferred embodiment of the present invention.

The timing diagram shows each enciphering unit alternately processes and outputs the inputted TS without time delay even though the processing time, i.e., enable section of each enciphering unit, is relatively longer than inputting time interval of the TS.

Meanwhile, in order to describe the present invention, an example of the scrambler having two enciphering units is described above. In practice, under the OpenCable™ standard, the scrambler having two enciphering units processes data at up to 50 Mbps, when the system is implemented in order to support the 39 Mbps data transmission rate of the channel modulated based on the 256 QAM. Of course, the complexity of the system increases about 60% but the processing speed increases about 80%.In the broadcasting environment requiring higher processing rates, the high-speed scrambling can be operated by simply increasing the number of the enciphering units.

As above-described, the method of the present invention can be embodied as a program and stored in a computer-readable recording medium, such as CD-ROM, RAM, floppy disk, hard disk, magneto-optical disk.

The present invention can provide the data transmission rate required by the OpenCable™ cable TV system when a broadcasting data scrambling system needed for providing services such as digital pay-TV service is implemented based on International Organization for Standardization (ISO)/International Electrotechnical Commission (IEC) 13818-1 (MPEG-2 system) and DVB-CSA. Hereafter, the present invention can cope with the broadcasting system in need of high data transmission rate.

The present invention can be used not only for a subsystem of the CAS for providing the pay-TV service in the digital cable TV system having the high-speed data transmission rate, etc. like the OpenCable™ standard but also for implementing high-speed scrambling in the broadcasting system in need of high-speed data transmission rate hereafter.

The present application contains subject matter related to Korean patent application No. 2003-95645, filed in the Korean intellectual Property Office on Dec. 23, 2003, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for scrambling high-rate data, the apparatus comprising:
   a first storing means for storing a transport stream (TS) inputted from an external device;
   a common key (CK) generating means for generating a CK by receiving a control word (CW) from an external conditional access system (CAS);
   a key scheduling means for generating predetermined number of keys (KK)s by receiving the CK from the CK generating means;
   a plurality of enciphering means for enciphering the TS transmitted from the first storing means based on the predetermined number of KKs and the CK;
   a second storing means for storing the TS enciphered by the enciphering means and outputting the enciphered TS; and
   a controlling means for controlling the multiple enciphering means.

2. The apparatus as recited in claim 1, wherein the each enciphering means includes:
   a CK storing means for storing the CK generated by the CK generating means;
   a KK storing means for storing the predetermined number of KKs generated by the key scheduling means; a block enciphering means for enciphering the TS transmitted from the first storing means based on the predetermined number of KKs stored at the KK storing means; and
   a stream enciphering means for enciphering the enciphered TS by the block enciphering means based on the CK stored at the CK storing means.

3. The apparatus as recited in claim 1, wherein the controlling means provides enable signals to the enciphering means, and wherein if the next TS is inputted while current TS is processed, the controlling means provides the enable signal to one of the idle-state enciphering means in order to process in real time without time delay.

4. The apparatus as recited in claim 3, the enabled enciphering means enciphers the TS based on the predetermined number of KKs and the CK, transmits the enciphered TS to the second storing means, transmits scrambling completion signal to the controlling means and change the state into the idle state.

5. A method for scrambling high-speed data, the method comprising the steps of:
   a) storing an inputted transport stream (TS);
   b) determining whether to perform scrambling or not by extracting a packet identifier (PID) information from the TS data and determining a control word (CW) to be used;
   c) selecting an idle-state enciphering unit among a plurality of enciphering units;
   d) generating a common key (CK) and a predetermined number of keys (KK)s which is required for enciphering based on the CW and storing the CK and the KKs;
   e) enciphering the TS based on the CK and the KiKs; and
   f) storing and outputting the scrambled TS.

6. The method as recited in claim 5, wherein in the step b) it is checked whether a PID-CW pair, which is matched to the current PID is stored in a CW memory storing the PID information and the CW as a pair.

7. The method as recited in claim 5, wherein in the step c), a controller selects the idle-state ciphering unit by providing an enable signal to the idle state enciphering unit.

8. The method as recited in claim 5, wherein in the step e), the enciphering unit enciphers the TS data based on the CK and the KKS, transmits them to the step f), transmits a scrambling completion signal to a controller, and changes the state into the idle state.

* * * * *